Sept. 8, 1970 D. A. STARR, JR 3,528,073

TRAPEZOIDAL-WAVEFORM DRIVE METHOD AND APPARATUS FOR ELECTROGRAPHIC RECORDING

Original Filed Dec. 29, 1965 2 Sheets-Sheet 1

INVENTOR.
DAVID A. STARR, JR.

George L. Kensinger
ATTORNEY

INVENTOR.
DAVID A. STARR, JR.
George L. Kensinger
ATTORNEY

United States Patent Office 3,528,073
Patented Sept. 8, 1970

3,528,073

TRAPEZOIDAL-WAVEFORM DRIVE METHOD AND APPARATUS FOR ELECTROGRAPHIC RECORDING

David A. Starr, Jr., San Mateo, Calif., assignor to Burroughs Corporation, Detroit, Mich., a corporation of Michigan Original application Dec. 29, 1965, Ser. No. 517,341, now Patent No. 3,453,452, dated July 1, 1969. Divided and this application Oct. 31, 1968, Ser. No. 772,258
Int. Cl. G01d *15/06*; H03k *4/60*
U.S. Cl. 346—74 12 Claims

ABSTRACT OF THE DISCLOSURE

Electrographic recording method and apparatus employing plural-electrode print heads and apparatus providing improved sloped drive waveforms for reducing the magnitude of noise potential coupled onto unselected print electrodes. The drive waveforms employed may be provided by apparatus presenting a controllable leading-edge ramp or may utilize a trapezoidal waveform generator, such as one including an amplifier having capacitive feedback coupled around first and second current switches.

This is a division of application, Ser. No. 517,341, filed Dec. 29, 1965, now Pat. No. 3,453,452. This invention relates to electrographic recorders employing multiple-element print heads. More specifically, the subject invention relates to a method and apparatus providing improved drive waveforms in electrostatic multiple-electrode matrix printer apparatus of the type utilized for forming characters and symbols on record surfaces.

In electrographic recording apparatus of the type disclosed in R. E. Benn et al. Pat. No. 3,068,479, of common ownership herewith, the printer matrix of each print head includes a plurality of pin electrodes grouped in an array with a bar electrode positioned adjacent each row of pins. Information signals are applied to selected ones of the pin electrodes and an opposite polarity signal is applied to the bar electrodes in the selected print head, the total difference of potential causing electrical discharges at the energized pin electrodes. These electrical discharges are useful for displaying a character or symbol, or for printing the same by deposition of electrostatic charges upon a record surface.

The close spacing of the electrodes in such printer matrices has been found to cause capacitive coupling of a portion of the drive potential onto unselected pin electrodes. Under certain conditions, such as high levels of humidity, for example, this coupled potential or cross talk on the unselected pin electrodes frequently resulted in undesired printed spots when the apparatus was used as a recorder. In other words, the high level of cross talk resulted in a low signal-to-noise ratio in the print head and prevented the achievement of reliable operation of selectively pulsed electrodes without occasional discharge and printing by some of the unselected electrodes.

One technique for reducing cross talk in such print heads is to provide as much space between the printer electrodes as can be practically obtained within the confines of the printer matrix. This is limited by the size of the characters or symbols to be printed. An increase in the spacing of the printer electrodes tends to decrease the magnitude of the potential coupled onto unselected pin electrodes and as a result reduces the incidence of uncontrolled discharges at the electrodes.

The cross talk in electrographic matrix printers can be reduced further by minimizing the extent of conductor alignment in the print head. The conductors connected to the several print elements may be made to fan out from the close spacing required at the printer matrices, and adjacent rows of the conductors may be displaced from alignment with each other. The spreading of the conductors in the print head reduces the alignment of them and expands the spacing between them as well, thus further decreasing the interelectrode capacitive coupling between the conductors.

Cross talk in electrical matrix printers can also be reduced by interposing conductive shields between adjacent rows of electrodes in the print heads, as disclosed in D. A. Starr, Jr., application Ser. No. 503,762, filed on Oct. 23, 1965, entitled, "Shielded Electrographic Transducer and Method for Fabricating the Same," having a common assignee herewith. These conductive shields, when connected to a point of reference potential, reduce the electrical induction between electrodes in adjacent rows of the printer matrices. The amount of reduction in the coupling by this method is limited, however, since the electrodes cannot thereby be completely shielded from each other.

None of the above-described techniques, either singly or in concert, reduced the interelectrode coupling enough to render insignificant the induced potential on unselected pins. The use of conductive shields placed between adjacent rows of the pin electrodes provided the greatest reduction in the coupled potential. These shields could not, however, be shaped or positioned to completely disassociate the electrodes from each other. The use of planar conductive shields in the print heads reduced cross talk between printer electrodes in adjacent rows of the printer matrices, but did nothing to reduce coupling between the pin electrodes within the rows themselves. Furthermore, it was found to be impractical to extend the conductive shields to the extreme ends of the print head electrodes due to the likelihood of arcing between the shields and the electrodes at the printing face and at the terminations of the print head electrode terminals.

Additionally, when the print heads were designed as removable assemblies, the conductor terminals utilized also could not be shielded completely without danger of arcing. And, when print heads were grouped for providing page printing apparatus as shown in Benn et al. U.S. Pat. No. 3,068,479, the connecting wires between the corresponding pin electrodes in the print heads introduced additional coupling between printer elements or channels which could not be easily eliminated by shielding. The complexity of the cabling limited the usefulness of planar shields and the high voltages employed made shielded cables impracticable, particularly in humid environments.

Accordingly, an object of the present invention is to eliminate printing by unselected printer elements in multiple-element electrographic printing apparatus.

Another object of the invention is to reduce cross talk on unselected print electrodes in matrix-type electrostatic printers, thereby improving the signal-to-noise ratio at the operating end of the electrodes.

A further object is to minimize electrical induction between electrodes in multiple-element electrical printers, thereby reducing the current in unselected printer elements.

A more specific object of the invention is to reduce the cross talk current in unselected electrodes in laminated electrostatic print head apparatus which is not eliminated by the use of conductive shields placed between the print head laminants.

In accordance with the above-stated objects, there is provided an improved method of recording with plural-electrode electrographic print heads wherein specially generated drive waveforms having substantially sloped leading and trailing edges are utilized for energizing the selected printer electrodes and initiating printing by those electrodes with substantially reduced cross talk on unselected electrodes.

In accordance with the subject invention, there is provided the combination of a multiple-element electrographic print head and printer element drive means, the drive waveforms of which are sloped to limit the maximum time-rate-of-change of the voltage waveform developed on the printer elements so that selected print head electrodes are energized without the induction of operating potential on any of the unselected electrodes. According to another aspect of the invention the print head electrodes are energized by drive waveforms substantially sloped on both the leading and trailing edges for reducing electrical induction between the print head electrodes during the entire actuation cycle.

Also in accordance with the invention, a multiple-electrode electrostatic printer apparatus having initiating pin electrodes and adjacent print-enabling bar electrodes is operated by substantially extended rise-time drive apparatus for developing printing potential on only selected printer electrodes. The sloped-waveform drive means of the invention may be advantageously utilized in combination with matrix-type electrographic print heads, which may be laminated and may include conductive shields between laminae, as well as with single-row electrographic recorders. In matrix print heads having rows of print elements positioned adjacent print control electrodes, individual trapezoidal waveform drive apparatus is provided for activating separately both the print and the control or print-enabling electrodes. The drive apparatus of the invention includes capacitive-feedback amplifying means for shaping the drive waveform and for regulating the drive current waveform in the printing apparatus.

Voltage transitions of a specified amplitude to be achieved in a given interval of time have the least peak value of time-rate-of-change in the transition interval if the slope is constant as in a ramp function. Such a ramp-type transition, therefore, results in the least peak value of capacitively coupled electrostatic cross-talk.

A feature of the invention resides in the regulated drive capability of the capacitive-feedback drive means, by which the allowable range of printer electrode impedances in electrostatic recorders is greatly increased. Such drive apparatus also permits the operation of different numbers of print heads without alteration of the drivers. Manufacturing tolerances can therefore be enlarged. Resistance changes resulting from variation in operating temperatures are similarly made less disruptive to reliable operation of the print heads by virtue of the drive apparatus of the invention.

By another feature of the increased driving capability of the subject invention the potential of the noise signals induced on unselected print head electrodes can be reduced by reducing the magnitude of the printer electrode current-limiting resistors. The increased and regulated drive capability also permits the use of either shielded or unshielded print heads without modification of the apparatus although shielded heads constitute a significantly larger load for the drivers.

An additional feature of the invention is that control of the drive waveform amplitude is provided independent of control of the rise-time of the print signals. This feature enables control of the printing potential to compensate for wear on the print head surface and to compensate for changes in the printing atmosphere, for example, without effecting the rise-time of the print signals and the related frequency of the undesired discharges at unselected print electrodes.

Other objects, features, and many of the attendant advantages of the invention will be readily appreciated and better understood by reference to the following detailed description, which may be considered in connection with the accompanying drawings wherein.

Figure 5:
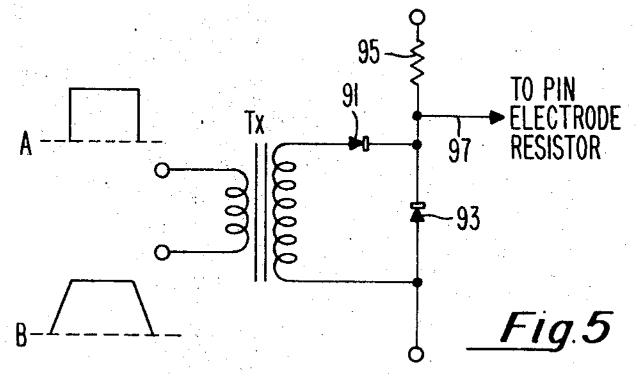
Figures 6, 7:
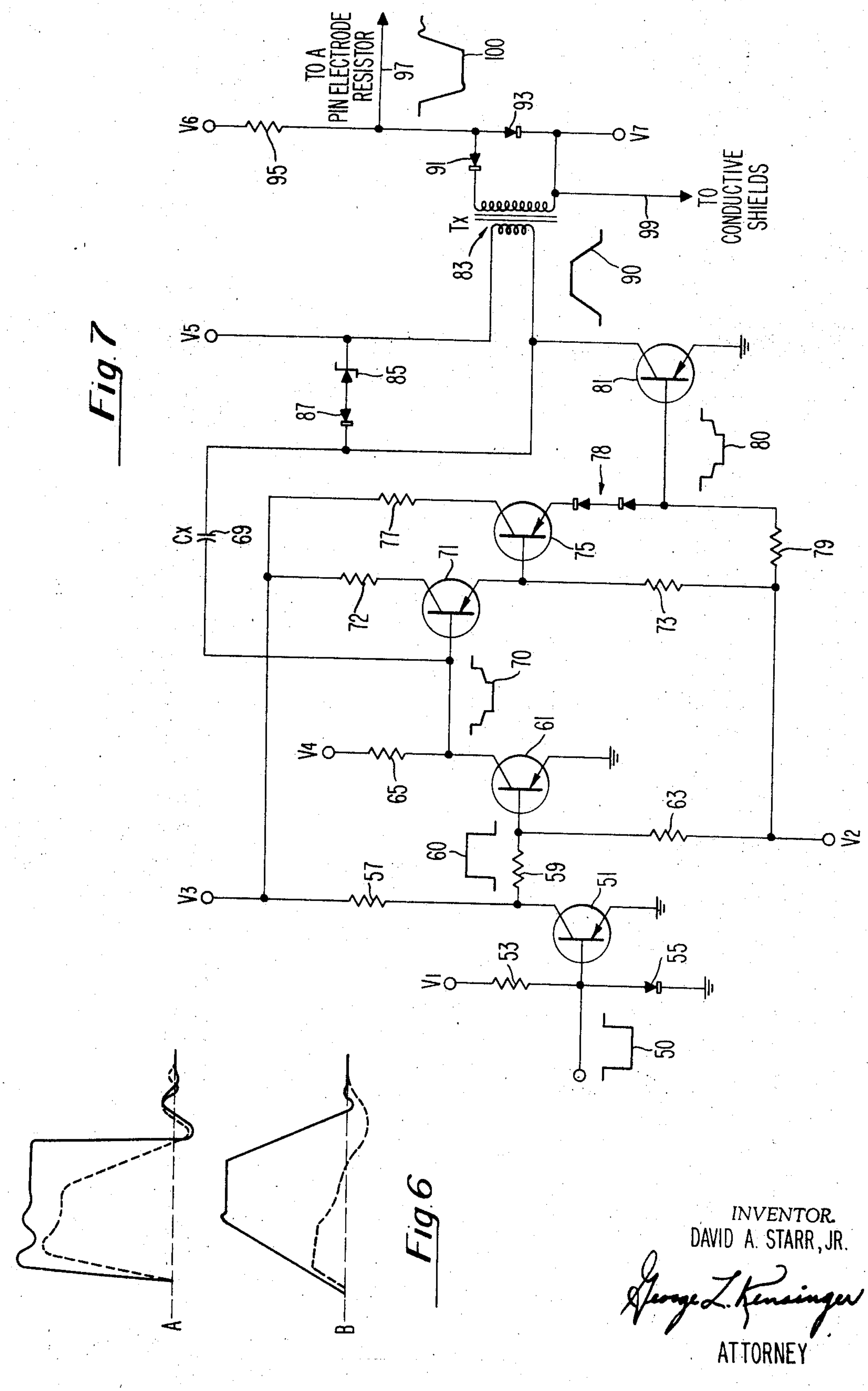

FIG. 5 is a functional schematic diagram of the last stage of a print pin driver circuit and includes a representation of the novel utilization of a substantially sloped electrical drive waveform as applied to the input of the circuit, and FIG. 6 illustrates the waveforms as observed on the operating end of the pin electrodes; and FIG. 7 is a schematic diagram of the novel pin pulse drive apparatus, including amplifier stages and a transformer output stage.

Figure 1:
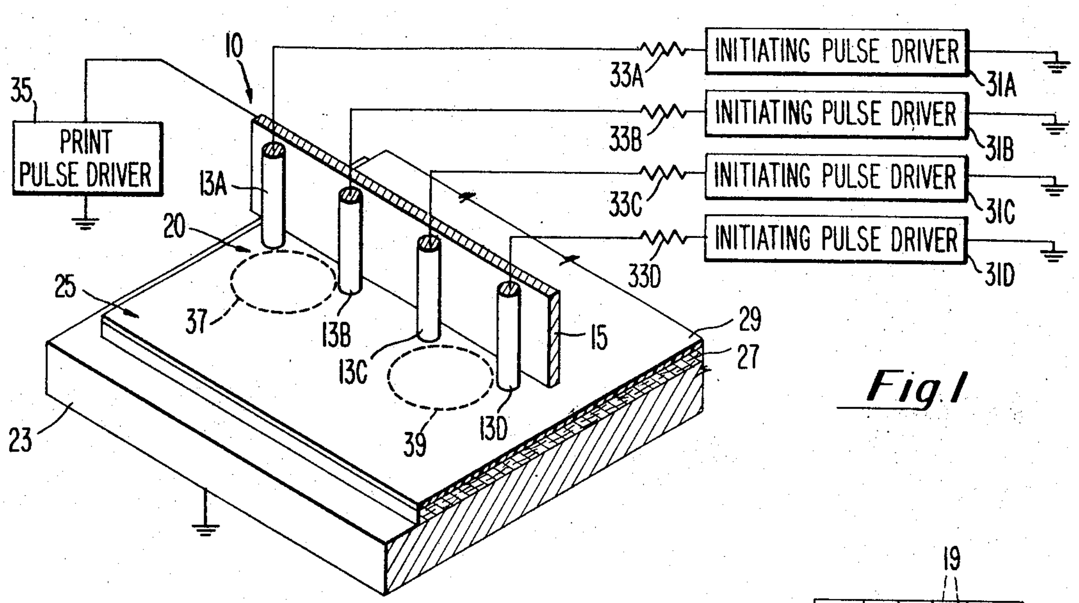
FIG. 1 is a perspective view of an electrographic print head having a single enable-print bear electrode positioned adjacent to several pin electrodes located at a printing position on a recording surface.

Referring to FIG. 1, an electrostatic print head 10 comprising initiating pin electrodes 13*a*, *b*, *c*, *d* and print-enable bar electrode 15, is shown in registration with printing position 20 on record medium 25. The latter is seen to rest upon conductive support member 23. Record medium 25 consists of a dielectric layer or coating 29, such as a polyethylene film, carried by conductive backing layer 27.

Pin electrodes 13*a*, *b*, *c*, *d* are connected by resistors 33*a*, *b*, *c*, *d* to initiating pulse drivers 31*a*, *b*, *c*, *d*, the pin resistors being situated in close proximity to the pins for preventing deterioration of the signal waveforms delivered to the pins. A print pulse driver 35 is coupled to the bar electrode as shown.

The initiating pulse drivers are selectively energized by information signals for raising the potential on selected pin electrodes 13. The initiating pin electrodes, being closely spaced with respect to each other and to the print-enabling bar electrode, capacitively store energy when actuated or energized by the initiating pulse drivers. This stored energy provides a significant portion of the energy required for initiating electrical discharges between the selected pins and the bar electrode which occur when it is pulsed with an opposite polarity print-enabling signal.

Resistors 33 are employed in the pin electrode circuits for limiting the driver current. Since the energy required for creating the electrical discharges can be stored at the operative end of the printing electrodes by a small current flow if sufficiently high levels of potential are employed, current drivers of low current capability can be utilized and high resistance current-limiting resistors 33 may be employed. The maximum allowable magnitude of these resistors is limited, however, since the interelectrode coupling in the printer, and consequently the magnitude of the induced noise potential, increases as the value of these resistors is increased. Moderately high value resistors and amplifiers of significant driving capability are, therefore, employed in the invention. The drivers are regulated by feedback circuitry as illustrated in FIG. 7 to control the slope of the drive waveforms and to permit use with print heads having different magnitudes of impedance.

Upon the application of a print-enabling pulse to bar electrode 15 from print pulse driver 35, an electrical discharge occurs at each of the selectively activated printer pin electrodes. This discharge appears as a spark discharge, provided adequately large current-limiting resistors are employed in the pin electrode driver circuits. The discharge removes energy from the charged pin electrode and terminates when the amount of charge on the selected pin falls below the level necessary to sustain the spark. Successive spark discharges will occur, however, so long as printnig level voltages are maintained on the pin and bar electrodes. If direct reading or verification of the information encoded in the print heads is desired, the electrical discharges initiated at the pin electrodes can be observed directly or recorded photographically.

The spark discharges at the ends of the selected pin electrodes created quantities of ions which can be propelled or caused to drift toward record surface 25 by a difference in potential between the discharge region and the record surface. In FIG. 1 the record medium and conductive support 23, which is in contact with conductive backing layer 27 of the record medium, are at ground potential. These deposited ions create a latent image of electrostatic charge on the record surface as illustrated in FIG. 1 by numerals 37 and 39 in registration with selected print pin electrodes 13_a_ and 13_c_. These latent electrostatically charged areas on the record surface, which approximate the shape of the print pin electrode, may be subsequently examined by reading apparatus or may be made visible by causing the adherence of toned ink particles to the charged areas. Record medium which can retain deposited electrical charges for long periods of time, alone or with ink particles adhered thereto, are readily produced. Electrically charged areas which are "developed" by ink particles can also be subsequently "fixed" or made permanent by the application of heat or pressure or both. For further details of the operation and features of such printing apparatus reference may be had to the earlier-mentioned R. E. Benn et al. U.S. Pat. No. 3,068,479.

The electrographic recording apparatus illustrated in FIG. 1 may be used for recording analog information or for printing or recording characters and symbols by depositing a plurality of charged spots on the record medium in the form or outline of the symbol or character. Characters and symbols are recorded with such apparatus by deposing spot charges from the pin electrodes at successive printing positions on the record surface. Relative translation of print head 10 with respect to the record medium between adjacent printing positions is required in this successive printing method.

Figure 2:
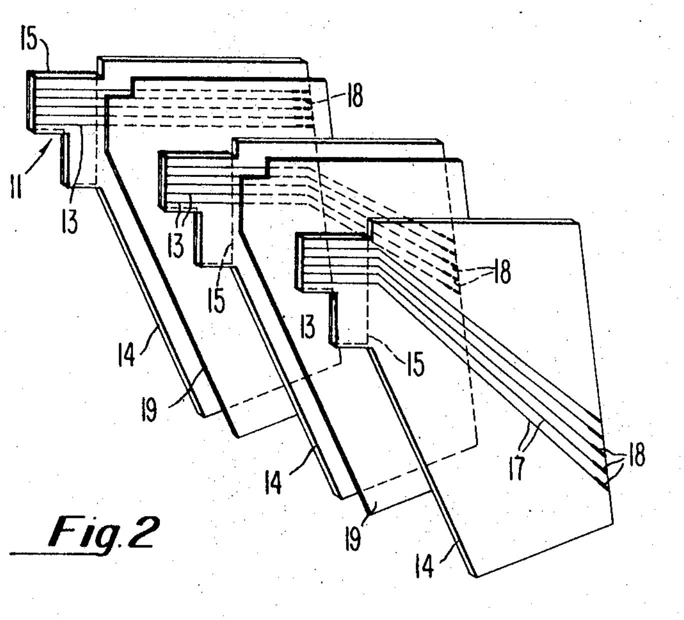
FIG. 2 is a perspective exploded view of the arrangement of print head laminae and conductive shields in a shielded print head.

An alternate method for recording characters or symbols utilizes a print head formed of several laminae, each including pin electrodes 13 and a bar electrode 15. As shown in FIG. 2, each print head lamina consists of an electrode support insulator 11 which carries print pin electrodes 13 and a bar electrode 15, with electrical insulation placed between the electrodes. The current-limiting resistors 33 also may be incorporated in the print head laminae in this embodiment by depositing them across gaps in conductive stripes 17 which connect the pin electrodes with their terminals 18, for example. Two or more print head laminae are then bonded together to form a matrix of print electrodes with bar electrodes adjacent each row of pins near the printing face of the heads so that an entire character or symbol may be recorded in a single step with a single pulse applied to the bar electrodes, which may be electrically interconnected. The laminating process is described more fully in Howell et al. application Ser. No. 856,868, filed Dec. 2, 1959, now Pat. No. 3,235,942, of common ownership herewith.

It has been observed that closed spacing of the pin electrodes in such printer matrices results in the coupling of potential from pin electrodes which are pulse or energized to unselected pin electrodes. This induced potential on the unselected electrodes occasionally results in discharge between the unselected pin electrodes and the adjacent bar electrodes when the atmosphere adjacent the print head surface is sufficiently conducive to printing. It has been discovered, as described in copending Starr application Ser. No. 503,762, filed on Oct. 23, 1965, of common ownership herewith, that this interpin coupling may be considerably reduced by inserting conductive shields, designated 19 in FIG. 2, between the print head laminae. As an incident of the use of such shields, the capacitive energy storage at the pin electrodes is increased, which presents increased loading upon the drive apparatus.

Although it would be beneficial if adjacent print head laminae were completely shielded from one another, it has been found that the conductive shields must be made smaller than the laminae between which they are placed to prevent arcing at the ends of the electrodes. The conductive shields, therefore, may not extend to the edge of the laminae at which the bar electrodes and the operating end of the pin electrodes are located. The shields also may not extend to the edge of the laminae at which are located the electrode terminals or connectors 18 in order to prevent arcing between the pin electrodes or their leads 17 or terminals 18 with the shields.

Figure 3:
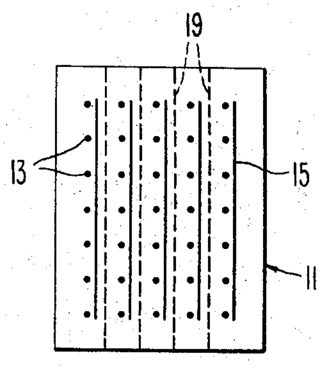
FIGS. 3 and 4 are enlarged views of two configurations for the printing face of a matrix print head assembled according to the illustration of FIG. 2.
Figure 4:
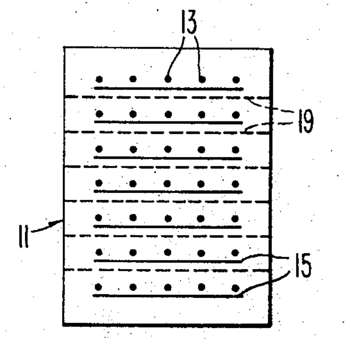

FIGS. 3 and 4 illustrate two configurations for the printing face of a matrix print head formed by the laminating process illustrated in FIG. 2. These illustrations are similar to the showing of Howell Pat. No. 2,918,580, assigned to the present assignee. In FIG. 3, thirty-five pin electrodes, designated 13, form a matrix having five rows of seven pins each, with each pin electrode being adjacent a bar electrode 15 as shown. Adjacent laminae are separated by conductive shields 19 which are indicated by broken lines since they are recessed from the printing face as explained in connection with FIG. 2. In the configuration of FIG. 3 the interpin coupling is reduced by the presence of four conductive shields among the laminae of the print head matrix.

In FIG. 4, a 35-pin matrix is shown in which six conductive shields 19 are placed in a print head which has seven laminae of five pins each, thus further reducing the induction of potential between adjacent pins. The two additional shields tend to reduce further the magnitude of noise voltage on unselected pins since each unselected pin electrode is exposed to fewer electrodes in the print head matrix as compared with a similar print head with four shields.

In a page printer such as illustrated in Epstein et al. Pat. No. 2,919,171, of common ownership herewith, there may be a large number of such matrix printing heads stacked in a line across the record medium. In such a printer system, the corresponding pins in each printer matrix are connected together by buses which are then connected to the initiating pulse drivers. The wires or conductors employed for connecting the corresponding pin electrodes of several print head matrices together introduce additional coupling between adjacent print pin electrodes which is also difficult to eliminate by shielding since conductive planes cannot be effectively utilized therebetween and the high voltages utilized may preclude the use of shielded cables, especially in humid environments.

In a printing operation using a laminated matrix print head with no shields between the laminae, a signal of approximately 900 volts was applied to all but the central pin electrode in a 35-pin matrix. By using a high voltage test probe connected to an oscilloscope, the voltage on the unselected pin was observed to be approximately 700 volts. The worst-case signal-to-noise ratio was, therefore, 9:7. While 900 volts may be necessary to assure reliable printing by the selected electrodes, 700 volts may well prove sufficient to cause occasional printing by unselected electrodes. As before mentioned, attempts to eliminate this coupled noise potential by skewing conductive stripes 17 and by maximizing the separation of the print pin electrodes and their leads proved to be inadequate to eliminate the coupling completely. The insertion of conductive shields 19 between the print head laminae achieved a substantial reduction in the noise potential coupled to unselected pins, but some coupled noise of short duration remained on the unselected pins.

The signals observed during the experiment for determining the worst-case signal-to-noise ratio are illustrated by the upper waveforms in FIGS. 5 and 6. FIG. 5 also shows the output transformer stage of typical drive apparatus for the electrodes of the print heads previously described. The output transformers $T_x$ are pulsed for driving their associated pin electrodes through the rectifying networks consisting of series diodes 91 and parallel diodes 93, which are connected to biasing resistors 95 as shown.

When the input drive waveform is substantially rectangular, as shown by waveform A at the transformer primary winding in FIG. 5, the drive signal provided to the associated pin electrode traces the solid line configuration of waveforms A of FIG. 6. The transformer output stage has been customarily designed to "ring" when pulsed and will, therefore, produce an output waveform having an overshoot at each end of the waveform as shown. A sharply rising output waveform A induces noise voltages on adjacent unselected pin electrodes of considerable magnitude, which is represented by the broken-line output waveform A of FIG. 6. This noise voltage has a slightly slower rise than the driven waveform, but may reach a magnitude of 700 volts, as compared to a driven waveform magnitude of 900 volts, as previously mentioned.

The noise waveform begins to decrease before the driven signal and at a slower rate than the driven waveform, as shown. Although it was found that the sporadic printing resulting from these induced noise voltages could be reduced by delaying the print pulse applied to the bar electrodes until after the noise voltages have begun to decrease or decay, occasional printing still occurred at unselected pin electrodes under certain atmospheric conditions. It was found that the sporadic noise printing could be completely eliminated only by further reducing the magnitude of the induced noise potential.

The lower waveforms of FIGS. 5 and 6 illustrate the performance of the subject printer apparatus when operated by a controlled rise-time drive waveform of trapezoidal configuration. The application of trapezoidal waveform B of FIG. 5 to the transformer primary winding causes output waveform B of FIG. 6 to be developed, with slight ringing at the leading and trailing edges as shown.

The "dashed" waveforms of FIG. 6 compare the noise voltage induced on an unselected pin when a print head is operated by a conventional rise-time drive as compared to a controlled rise-time drive waveform of essentially trapezoidal configuration.

The induced noise voltage waveform B of FIG. 6 which arises when trapezoidal drive waveforms are applied is smaller than and begins to decay much more rapidly than the noise waveform that occurs when short rise-time drive signals are applied (waveform A of FIG. 6), so that electrical discharges do not occur at the unselected electrodes in apparatus of the type shown in FIGS. 1 and 4. The coupled noise potential is at its lowest magnitude when the leading and trailing edges of the drive waveforms are sloped as much as possible and the slopes are made constant so that the change of the drive voltage waveform per unit of time is minimized.

FIG. 7 is a schematic diagram of the novel pin electrode drive apparatus employed in the subject invention. The apparatus includes current drivers, one of which includes capacitive negative-feedback, and an output transformer stage for connection to a pin electrode in a print head or to all corresponding pin electrodes in a plurality of print heads. A controlled rise-time or trapezoidal waveform driver may also be advantageously utilized as the print pulse driver for pulsing the bar electrodes in the print heads.

In the driver circuit the base of a first transistor 51 serves as an input terminal which is biased by positive potential $V_1$ through resistor 53 and referenced to ground through forward-biased diode 55. The emitter of transistor 51 is grounded. Its collector is connected to output resistor 57, which is referenced to potential $V_3$ and coupled through resistor 59 to the base of the transistor 61, which is biased by potential $V_2$ through resistor 63.

The emitter of transistor 61 is grounded. Its collector is connected to output resistor 65 which is referenced to $V_4$, and to the base of transistor 71 which also is connected to one side of feedback capacitor $C_x$, designated 69 in the figure. The collector of transistor 71 is biased by potential $V_3$ through resistor 72. The emitter is referenced to potential $V_2$ through resistor 73 and is connected to the base of transistor 75. The collector of transistor 75 is connected to resistor 77, which is referenced to $V_3$. Its emitter is coupled through series diodes 78 and resistor 79 to potential $V_2$.

The base of transistor 81, a phase-reversing amplifier, is connected between diodes 78 and emitter resistor 79 of transistor 75 as shown. The emitter of transistor 81 is grounded. Its collector is connected to the primary winding of output transformer $T_x$, which is referenced to potential $V_5$ and to the other side of feedback capacitor $C_x$ 69 and to potential $V_5$ by diode 87 in series with Zener diode 85.

The secondary winding circuit of transformer $T_x$ is similar to that shown in FIG. 5 except that diodes 91 and 93 are reversed to accommodate signals of opposite polarity. The secondary winding is referenced to potential $V_7$, to which the conductor shields of the print heads and associated cables are connected, and resistor 95 is referenced to $V_6$ as shown.

The circuit is operated by applying a substantially rectangular input signal 50 to the base of transistor 51, which presents amplified rectangular signal 60 to the base of transistor 61. The output of transistor 61 is negative-going as shown, but has stepped leading and trailing edges, unlike its input waveform. The capacitive negative-feedback current through capacitor 69 is nearly constant in amplitude and causes the change in this signal waveform. As transistor 61 begins to drive the base of transistor 71 negative, transistors 71, 75 and 81 begin to conduct. As transistor 81 turns on, its collector begins to go positive, which, through capacitor $C_x$, prevents the signal developed at the base of the feedback amplifier from rapidly approaching its negative bias potential. The rise-time of the signal and the amplitude reached is a function of the magnitude of capacitor 69 and associated resistor 65 and of the output voltage per unit input current of the amplifier comprising transistors 71, 75 and 81 and the associated circuitry. As this circuit operates similar to a Miller Integrating Circuit during the initial rise of the pulse waveform, additional information and explanation may be obtained by reference to the description of the vacuum tube operational integrator at pages 621 through 624 of Terman et al., Electronic and Radio Engineering, McGraw-Hill Book Company (New York, 1955).

As transistor 81 is turned on further, the signal at its collector continues to increase in magnitude at a substantially linear rate until it becomes saturated. At this point, the output signal of transistor 81 levels off at a voltage level determined by independently controlled bias levels to form a plateau in the waveform. The feedback signal then falls from its maximum amplitude and transistors 71 and 75 saturate and produce output waveform 80 which also has a stepped leading edge as a result of the capacitor negative feedback. In contrast to the characteristic performance of the operational integrator referred to above, it is important to this invention that the generated drive waveform provide a signal plateau during which the printing can be effected. It is also important that integrating circuit-type operation be achieved during the initial rise so that the drive waveform is regulated when functioning to store energy on the selected pin electrodes.

The trailing edge of the drive waveform coincides with the termination of the input pulse and decreases slowly under control of the capacitive negative-feedback through capacitor 69, in similar fashion. As the drive on transistor 61 decreases, its output signal begins to rise toward its quiescent level and causes transistors 71, 75 and 81 to decrease conduction until transistor 81 is turned off after a linear decrease in magnitude, thus forming a trapezoidally-shaped drive waveform 90.

The trapezoidal waveform 90 provided to transformer $T_x$ is stepped-up and inverted before being presented to the associated pin electrode or electrodes through diode 91. The output waveform to the pin electrodes is biased by potentials $V_6$ and $V_7$ which are connected across resistor 95 in series with diode 93 as shown. Conductor 99 also connects reference potential $V_7$ with the conductor shields located between the print laminae.

The signal waveform applied to the pin electrodes from the secondary circuits of the output transformers is trapezoidally shaped and includes a slight overshoot at its leading and trailing edges due to the "ringing" of the transformers. This output waveform causes the selected pin electrodes to discharge across to the adjacent bar electrodes to effect printing. The driven waveform appearing on the selected pin electrodes is similar to the solid line illustration B of FIG. 6, as shown, and the amplitude as illustrated by the broken line waveform B of FIG. 6.

In the worst-case noise test of a shielded print head in which all but the central one of the pin electrodes of a print head were pulsed with a trapezoidal waveform, a small noise voltage and consequently a large signal-to-noise ratio was observed. When a 900-volt trapezoidal pulse was applied to the selected pin electrodes, the noise potential on the unselected central electrode reached a magnitude of only 180 volts compared to a previous amplitude of 700 volts. The improved signal-to-noise ratio was therefore 9:1.8, approximately a four to one improvement. The significantly large reduction in noise potential resulted in prevention of undesired printing by unselected electrodes in apparatus of the type illustrated in FIGS. 1 through 4 and reliable unobscured printing of characters and symbols was thereby obtained.

The trapezoidal waveform drive method of the subject invention may also be effected by the use of other known circuits, albeit with less satisfactory results. The Lewis Pat. No. 3,019,391, issued on Jan. 30, 1962, for example, could be utilized for generating the drive waveform, although not providing control of the fall-time of the signal. The apparatus of U.S. Pat. No. 3,007,055, issued to L. F. Herzfield on Oct. 31, 1961, could also be utilized, but would introduce great complexity and cost to the printer system.

While the above-description is provided for enabling anyone skilled in the art to make and use the subject invention, the details of construction and operation are for illustration only. The invention may be practiced otherwise than as specifically described, within the scope of the claims that follow.

What is claimed is:

1. An improved method of printing discrete spot matrix character representations utilizing plural-electrode electrographic recording apparatus comprising the steps of:

generating an electrical drive signal for each spot of the matrix character to be printed, controllably and selectively extending the rise-time and substantially linearly sloping the leading edge of said generated drive signals by automatic control means without affecting the signal magnitude, and applying the resulting drive signals to selected electrodes and applying concurrent control signals to the recording apparatus for enabling the electrographic printing of a desired character with limited induction of potential on the unselected electrodes.

2. The improved printing method of claim 1 further including the step of applying a print control pulse to the recording apparatus after the expiration of the rise-time of the drive signals applied to the recording electrodes.

3. The printing method of claim 1 including the step of controllably extending the fall time and substantially linearly sloping the trailing edge of the drive signals before application to the selected recording electrodes.

4. In a method of printing matrix-type character representations utilizing multiple electrode electrographic recording apparatus, the improvement comprising:

generating an electrical drive signal for each matrix point of the character representation to be printed, substantially linearly extending the rise-time of the drive signals by subjecting the signals to substantially constant amplitude negative feedback current, and applying the extended rise-time drive signals to selected recording electrodes and applying concurrent print control signals for effecting the printing of the desired character with greatly reduced induction of noise potential on the unselected electrodes.

5. The improved method of claim 4 in which the drive signals are subjected to capacitive negative feedback for extending the fall-time as well as the rise-time of the drive signal for further reducing induced noise potential on the unselected electrodes.

6. The method of claim 4 further including the step of applying a print control signal to the recording apparatus at a selected point in time with respect to the rise-time of the drive signals.

7. An improved electrographic recording apparatus comprising in combination:

a multiple electrode electrographic print head having an array of print electrodes situated in a printing face to be positioned adjacent a recording surface, common electrode means positioned for cooperation with selected ones of the print electrodes to establish electrical discharge therewith responsive to print control signals, and means for initiating electrical discharge between selected print electrodes and the common electrode means to record a desired character or symbol, comprising drive means coupled to controlled rise-time control means coupled to each print electrode for providing electrical drive waveforms which have leading edges of preselected slope and of selectable amplitude determined by the control means, to develope printing potential on selected print electrodes and to limit the induction of potential on unselected electrodes.

8. The electrographic recording apparatus of claim 7 in which the controlled rise-time control means utilizes substantially constant current negative feedback means for substantially linearly regulating the rate of rise of the drive signal waveforms.

9. The recording apparatus of claim 7 further characterized in that the common electrode means is positioned proximate the print electrodes and control signal generator means is coupled to the common electrode means for enabling printing after the initial rise of the drive signals.

10. In an electrographic matrix-type recording apparatus wherein electrical discharges between selected ones of an array of initiating pin electrodes and at least one adjacent print enabling electrode at the face of a print head are responsive to print control signals for printing characters or symbols on a recording surface, the improvement in combination with said print head comprising:

selectively operable signal pulse generating means, signal waveform shaping means coupled to said pulse generating means and comprised of a signal amplifier having capacitive negative feedback in which the time constant of the capacitance and its charging resistance is shorter than the duration of the signal pulse, and coupling means for electrically coupling the signal shaping means with a pin electrode in the print head.

11. The electrographic recording apparatus of claim 10 wherein the signal amplifier is a semiconductive phase-reversing amplifier and a capacitor is employed to connect the amplifier output terminal directly to its input terminal.

12. The recording apparatus of claim 11 including a control signal generator coupled to the print enabling electrode for causing the electrographic printing to occur at a selected point in time with respect to the rise-time of the signal waveform.

References Cited

UNITED STATES PATENTS

| | | | |
|---|---|---|---|
| 3,178,718 | 4/1965 | Le Baron | 346—74 |
| 3,275,851 | 9/1966 | Bedingfield | 307—263 |
| 3,312,837 | 4/1967 | Flynn | 307—263 |

BERNARD KONICK, Primary Examiner

G. M. HOFFMAN, Assistant Examiner

U.S. Cl. X.R.

307—263, 278; 328—114